July 14, 1936.  C. C. TOWNE  2,047,499
TREATMENT OF HYDROCARBON GASES
Filed Aug. 19, 1931
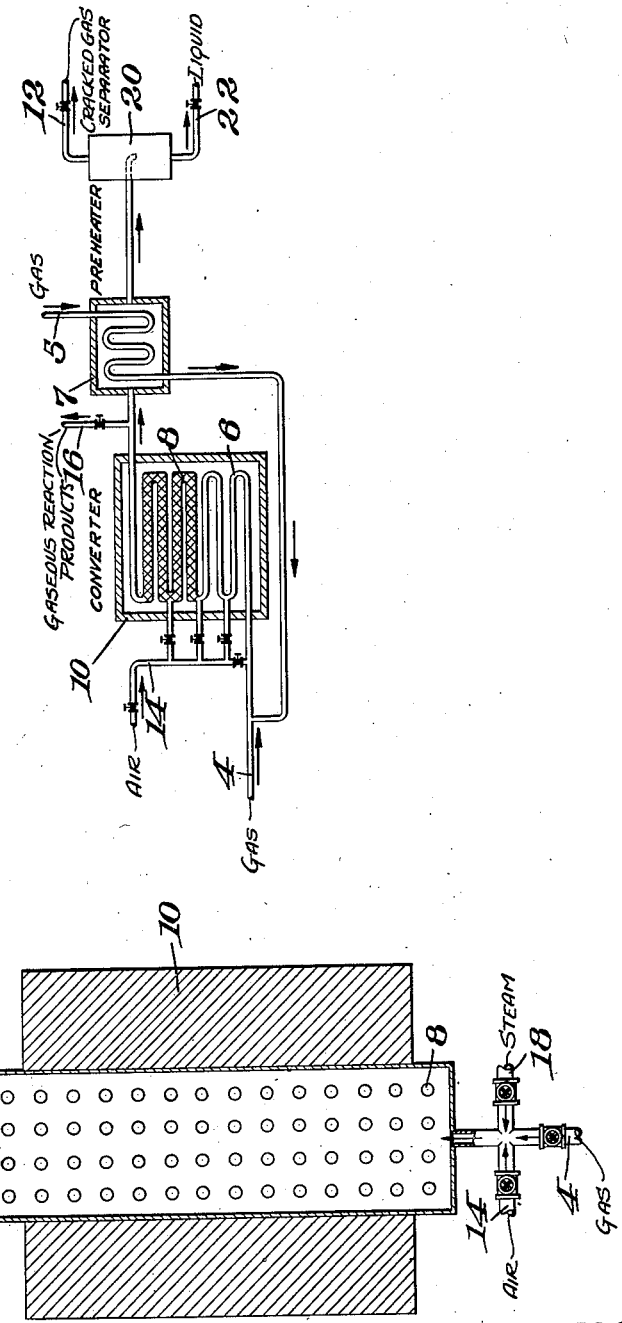
CHARLES C. TOWNE
INVENTOR
BY R. J. Dearborn
HIS ATTORNEY Patented July 14, 1936

2,047,499

UNITED STATES PATENT OFFICE 2,047,499

TREATMENT OF HYDROCARBON GASES

Charles C. Towne, Elizabeth, N. J., assignor to The Texas Company, New York, N. Y., a corporation of Delaware Application August 19, 1931, Serial No. 557,995

2 Claims. (Cl. 48—196)

This invention relates to the conversion of hydrocarbon gases and more particularly to the conversion or reformation of hydrocarbon gases of relatively high calorific value into products of lower calorific value, suitable for city or domestic use.

Gases that may be treated, according to my process, may be any hydrocarbon gases occurring naturally or resulting from refinery practice. Gases that have been treated comprise natural and refinery gas, such as still gases, gases from storage tanks and residual gases from stabilization of natural gasoline. The gases suitable for treatment are usually relatively high in B. t. u. value, for example, in excess of 600 B. t. u. They are usually rich in paraffins, such as methane, ethane and propane, although some olefines may be present.

The gases used for domestic or city fuel purposes, such as artificial gases, have a B. t. u. value of around 550 per cubic foot. In contrast to this, the B. t. u. of natural or refinery gases is about 800 to 1100 B. t. u. or more and usually in the vicinity of 1000. In order therefore to utilize the large quantities of light petroleum gases which are available for city purposes it is highly desirable to reform or reduce the calorific value of these gases to that suitable for domestic use.

Heretofore hydrocarbon gases have been reformed by passing the gases through gas generators in which coke is used as a contact material. The gases are passed over an incandescent bed of coke and alternately steam is blown therethrough to clean the bed of carbon deposited as a result of the decomposition of the gases. The resulting vapors from the gas generators are enriched with uncracked gas to the correct calorific value.

Instead of passing the hydrocarbon gases over an incandescent bed of coke to effect conversion thereof, I subject the gases to conversion temperatures in the presence of suitable catalysts by passing them over certain catalytic refractory materials at high temperatures. The heat value of the resulting products can be decreased to any extent as a result of the cracking of the gases into lighter constituents with a corresponding increase in volume.

Catalysts have been used heretofore in conversion or cracking of hydrocarbon gases but, so far as I am aware, substantial quantities of tar and other liquids have been simultaneously formed. A feature of the present invention is the conversion or cracking of hydrocarbon gases with the formation of little or substantially no tar. I have found that certain catalysts or contact agents have the peculiar property of selectively cracking heavier gases into lighter products of unsaturated or olefinic character without the simultaneous formation of large amounts of polymerization or condensation products such as tar and other aromatic liquids. The suppression of tar formation in the conversion of gases is often a distinct advantage in that a convenient means is provided for reforming gases of high calorific value into a high yield of products of lower calorific value.

Catalysts which have been found suitable for use, according to the invention, are preferably inorganic or argillacious refractory substances which provide relatively large surfaces for contact. A particularly valuable catalyst is activated alumina, which effects substantially complete suppression of tar or liquid formation. Other catalysts that are useful comprise certain porous mineral contact agents such as pumice, bauxite and fuller's earth. The catalytic effect of the latter materials may be increased by the deposition or impregnation of certain catalytic oxides such as iron, copper or nickel oxides upon the surfaces or into the pores thereof.

The deposition of the metallic oxides upon the supporting materials mentioned heretofore such as pumice, bauxite or fuller's earth, may be accomplished by soaking them in a strong solution of certain salts of the preferred metals. The nitrates are especially useful, since they are readily decomposed by heat into the corresponding oxides. It is often advantageous to roast the material to be impregnated at a temperature of 500° C. prior to soaking in the salt solution, since this roasting tends to dehydrate the porous material and increase the absorption of the solution. The unsaturated material is then heated to about 600° C.–700° C. to decompose the salt into the corresponding oxide which is uniformly deposited over the surface and in the pores of the supporting material.

It is preferable, especially in the case of alumina, to effect activation thereof prior to use. This is conveniently done by heating the material in a current of air to temperatures slightly in excess of the temperature it is contemplated that should be used in the conversion process.

The treatment of the gases may be accomplished by heating a stream of the gas and passing it through or over a bed of the catalyst. The catalyst may advantageously be heated to the desired temperature and the gas preheated, if desired, and conducted through the catalyst. The rate of flow and time of contact will depend upon the materials treated but this may conveniently be regulated to produce the desired degree of conversion. Sometimes it is advantageous to convert the gases to the desired extent so that the exit gases will have the correct B. t. u. Other times it may be desirable to convert the gases more extensively or in excess of that required to produce a final product of the correct B. t. u. and then mix the converted product with some untreated or raw gas to produce a blend of a given calorific value.

In the treatment of gases according to the invention deposits of carbon are sometimes formed upon the surface or in the pores of the catalysts which, if allowed to accumulate, will choke up the apparatus or decrease the efficiency of the catalytic material. To overcome this difficulty, it is often necessary to discontinue the flow of gas and to blow steam and air through the catalytic bed to remove the carbon. Gases resulting from the reaction of the steam and air with the carbon may then be blended with the previously converted hydrocarbon gases, if desired, or vented to the air.

The carbon deposited on the catalytic refractory material, in my process, has been found to be of distinctly different character than that resulting from other processes in which tar and other aromatic liquids are produced. In the latter processes, wherein the contact agents act as polymerizing catalysts, the carbon deposited is graphitic in appearance. In my process the carbon deposited is sooty which indicates that the catalyst in this instance acts in a different capacity, probably as a de-polymerizing agent.

In order that the invention may be more clearly understood reference will now be had to the accompanying drawing in which—

Figure 1 is a diagrammatical representation, with parts in section, of one type of apparatus for carrying out the invention.

Figure 2 is a modification showing a coil conversion element instead of an enlarged tube and certain other variations which will be more fully described hereinafter.

Referring to Figure 1, the gas to be treated, such as natural gas or certain fractions of the gases from a natural gasoline stabilizer, is drawn from a suitable source of supply (not shown) through the line 4 to the conversion chamber or tube 6. The gas while passing through the tube 6 comes into intimate contact with the catalytic material 8 which is packed in the tube. The tube 6 is located in a suitable furnace 10 which may be heated electrically or by means of a suitable burner. In passing through the tube the gas is subjected to a temperature in the range of 650° C. to 950° C., preferably about 800° C., and maintained in the presence of the catalyst for an interval ranging between about ½ minute and 5 minutes. Conversion of the gas takes place whereby gaseous products are formed causing an increase from 25% to 150% in volume and a corresponding decrease in B. t. u. per cubic foot. The degree of conversion necessary to produce a product of the desired calorific value will depend on the nature of the charge and the extent of the conversion which can be suitably controlled by the temperature and the time of contact with the catalyst. By treating a gas with a B. t. u. of about 1000 it has been possible to reduce the calorific value to around 450 to 550 B. t. u. without formation of substantial quantities of tar or other liquids. The cracked gas is withdrawn from the conversion tube through a pipe 12 and may be passed to a gas holder or other suitable receiver.

The catalyst in the tube 6 is preferably activated, prior to introduction of the raw gas, by heating to 850° C.–1000° C. and passing air therethrough. Branch line 14 is accordingly provided for the introduction of the air into the line 4 leading to the bottom of passageway 6. The spent air may be vented from the top of the apparatus through the branch pipe 16.

Carbon is often deposited on the catalytic material in the tube 6 during the conversion operation. The resulting deposit tends to interfere with the efficiency of the catalyst and the free passage of gas if not removed. The carbon may be removed at intervals by stopping the flow of charge gas and introducing air and steam through the pipes 14 and 18 respectively. The reaction of the steam and air with the carbon produces a gaseous reaction product which may be vented through the pipe 16 or withdrawn through the pipe 12 to be blended with the cracked gases.

Referring to Figure 2, the converter is shown as a coil or tubular element 6 located in a furnace 10. The coil 6 may be slightly enlarged throughout or consist of an enlarged portion 8 containing a suitable catalyst. The gas to be treated may be supplied through line 4 or through line 5. In the latter case, it may be preheated by indirect heat exchange with the hot products from the converter in a heat exchanger 7. The conversion products may be discharged into a separator 20 to separate tar or carbon. The separator 20 may be omitted, however, depending on whether any material to be separated is formed, since some catalysts produce substantially no liquids while others may produce a small amount; or the separator may be placed between the converter and the preheater. The converted gases are withdrawn through line 12 while any material collected in separator 20 may be discharged through pipe 22. A line 14 is provided to introduce air or steam or both into the line 4 or into various sections of the converter 6 and a vent line 16 is adapted to vent the spent gases, if desired. The operation of the apparatus shown in Figure 2 is essentially the same as described in connection with Figure 1.

Obviously many modifications and variations of the invention, as hereinbefore set forth, may be made without departing from the spirit and scope thereof, and therefore only such limitations should be imposed as are indicated in the appended claims.

I claim:

1. The process of reforming hydrocarbon gas, such as natural gas, refinery gas and the like, having a thermal value in excess of 600 B. t. u. per cubic foot, which comprises subjecting such gas to contact with alumina previously activated with air at a temperature of about 850° to 1000° C., for a period of time not in excess of five minutes at a temperature of from about 800° C. to 950° C. to reduce the thermal value of said gas to around 550 B. t. u. per cubic foot.

2. The process of reforming hydrocarbon gas, such as natural gas, refinery gas and the like, having a thermal value in excess of 600 B. t. u. per cubic foot, which comprises passing air over a body of alumina at a temperature of from about 850° to 1000° C., then subjecting gas to be reformed to contact with the thereby activated alumina at a temperature of from about 800° to 950° C. for a period of time not in excess of five minutes to reduce the thermal value of the gas to around 550 B. t. u. per cubic foot.

CHARLES C. TOWNE.